(No Model.) 2 Sheets—Sheet 1.

A. MYERS.
CLUTCH.

No. 481,046. Patented Aug. 16, 1892.

Witnesses:

Inventor
Alvie Myers
By James Sheehy
Attorney

THE NORRIS PETERS CO., PHOTO-LITHO., WASHINGTON, D. C.

(No Model.) 2 Sheets—Sheet 2.

A. MYERS.
CLUTCH.

No. 481,046. Patented Aug. 16, 1892.

Witnesses:
C. H. Raeder
K. F. Matthews.

Inventor
Alvie Myers
By James J. Sheehy
Attorney

UNITED STATES PATENT OFFICE.

ALVIE MYERS, OF MELMORE, OHIO.

CLUTCH.

SPECIFICATION forming part of Letters Patent No. 481,046, dated August 16, 1892.

Application filed April 23, 1892. Serial No. 430,306. (No model.)

*To all whom it may concern:*

Be it known that I, ALVIE MYERS, a citizen of the United States, residing at Melmore, in the county of Seneca and State of Ohio, have invented certain new and useful Improvements in Friction-Clutches; and I do declare the following to be a full, clear, and exact description of the invention, such as will enable others skilled in the art to which it appertains to make and use the same.

This invention relates to clutches which are designed to operate by friction and which connect a pulley with its shaft, whereby the two will revolve together, transmitting the power from one to the other, according as the pulley or the shaft is the power-driven element.

The object of the invention is simplicity and arrangement of the parts, combined with efficiency and convenience in the operation of the clutch.

The improvement consists, essentially, of shoes at the outer ends of rods, constructed to bind against the inner side of the band of a pulley, a collar having wedge-shaped projections to press outward on the inner ends of the rods, and two collars having their meeting faces provided with a series of cam-faces, whereby on imparting a rotary movement to one or both of the said cam-faced collars the latter will separate and force the wedges against the inner ends of the said rods and press the shoes into binding relation with the inner side of the band of the pulley.

The invention further consists of the novel features and the peculiar construction and the combination of the parts, which will be hereinafter more fully described and claimed and which are shown in the accompanying drawings, in which—

Figure 1:
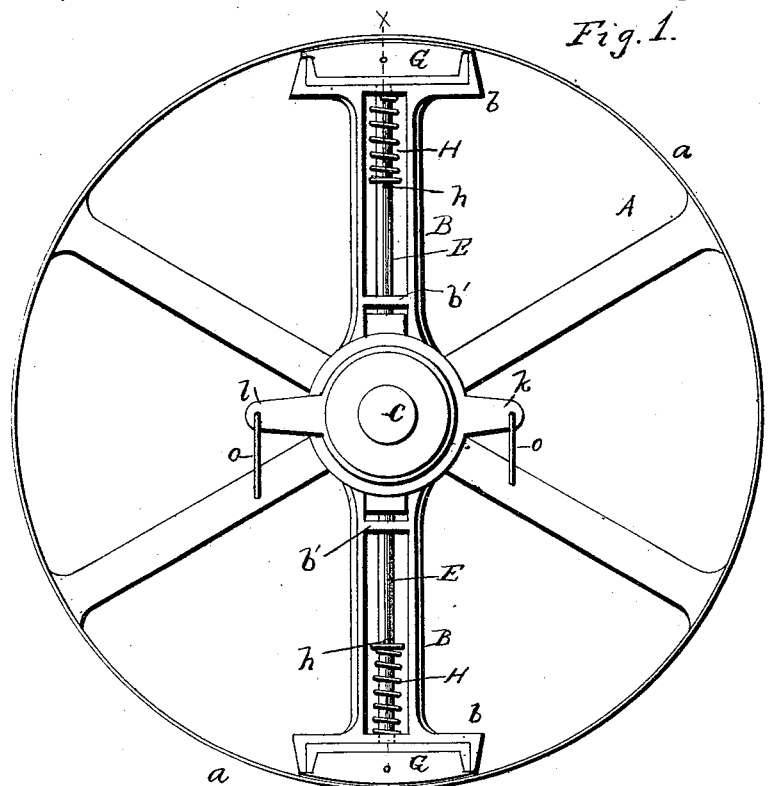
Figure 2:
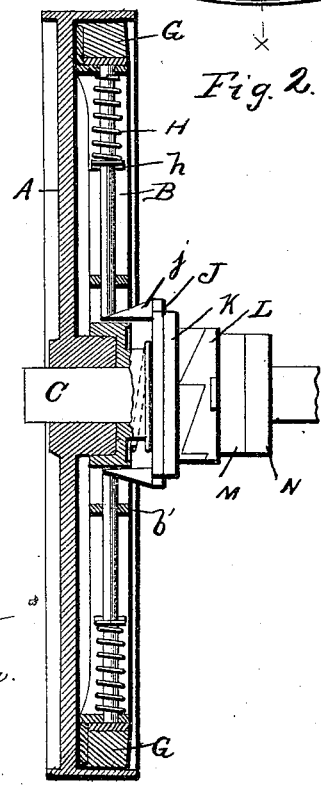
Figure 3:
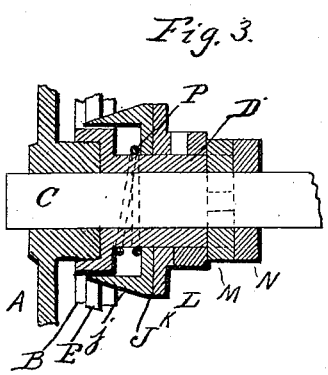
Figure 4:
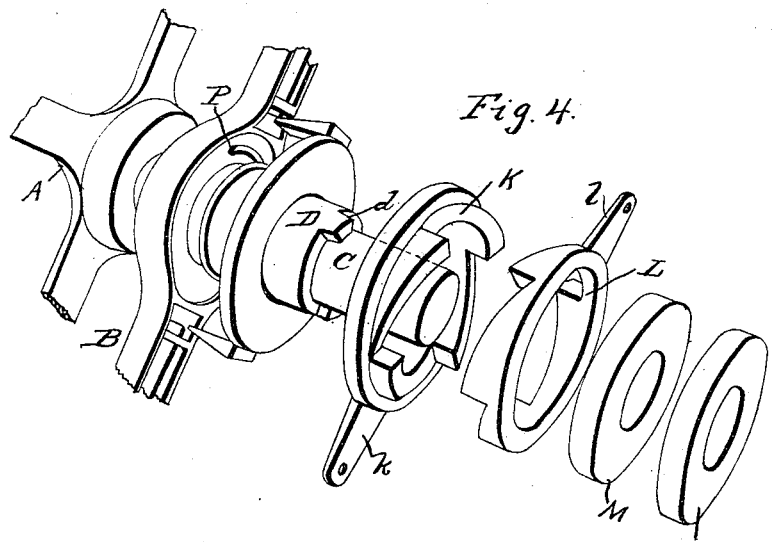
Figure 5:
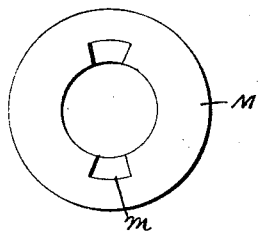
Figure 6:
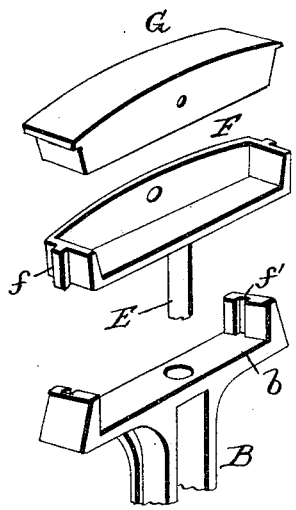

Figure 1 is a side elevation of the invention, showing its application. Fig. 2 is a vertical section on the line $x\ x$ of Fig. 1, showing the several collars in full. Fig. 3 is a sectional detail view of the hub of the pulley and the clutch-operating mechanism. Fig. 4 is a detail perspective view showing the several parts separated and arranged in their relative positions, the outer portion of the pulley and the shoe-supporting arms being broken away. Fig. 5 is a view of the inner face of the collar which is applied to the outer end of the sleeve on which the clutch-operating mechanism is mounted. Fig. 6 is a detail view of the outer end of one of the arms which support the shoes, showing the shoe and the seat for the shoe at the outer end of the rod, the parts being separated and arranged in their relative positions.

Like letters of reference indicate corresponding parts in all the figures of the drawings.

The pulley A and the shaft C may be of any well-known construction, being shown to illustrate the application of the invention. The arms B for supporting the shoes have cross-heads $b$ at their outer ends and are provided at their inner ends with a sleeve D, on which the mechanism for operating the clutch is mounted. These arms are separated or constructed with a space between their edge portions to make room for the rods E, which are adapted to work through the cross-heads $b$ and a cross-bar $b'$ near the inner ends of the said arms. The seat F, provided at the outer end of each rod E, is closed on the bottom, the ends, and one side and is provided with tongues $f$ on its end portions to work in corresponding grooves $f'$ in the end portions of the cross-head $b$ to guide the shoe and hold it in the plane of the pulley. The spring H, mounted on the rod E and confined between a stop or pin $h$ on the said rod and the cross-head $b$, presses the rod in toward the shaft and normally holds the shoe from contact with the inner periphery of the band $a$ of the pulley. The collar J, loosely mounted on sleeve D, has wedge-shaped projections $j$, which extend across the path of the rods E and engage with the inner ends thereof. The collars K and L, also mounted on sleeve D, have a series of cam-faces on their meeting faces and are provided, respectively, with arms $k$ and $l$, to which coils or other connections $o$ are attached for conveniently operating the said collars to throw the clutch in gear. The collar M is held to the sleeve by means of projections $d$ at the end of the sleeve entering depressions $m$ on the inner face of the said collar M and may be secured to the said sleeve thereby, or the said collar M may be held in place by collar N, which is secured to the shaft C. The collars J, K, and L are held a proper distance from the arms B by means of a spring P, which surrounds the sleeve D and is confined between the collar J and the arms B.

To operate the clutch, one or both of the cam-faced collars K and L are rotated on the sleeve D, preferably by pulling down on the arms k or l through the connections o in such a manner that the cam-faces on the said collars K and L will cause the latter to separate and press the collar J toward the pulley A and force the wedge-shaped projections j under the inner ends of the rods E and cause the latter to move outward and force the shoes G in frictional contact with the rim a, thereby locking the shaft and the pulley, so that they will revolve together. When the collars previously actuated are released, the spring P will force the collar J away from the pulley and withdraw the projections j from beneath the rods E and the springs H will release the shoes from the band of the pulley in the manner already set forth.

Having described my invention, what I claim is—

1. In a clutch, the combination, with a pulley and arms concentrically mounted with the pulley, of rods carrying shoes at their outer ends, supported by the said arms, a collar having wedge-shaped projections to engage with the said rods, and two collars concentric with the pulley and having cam-faces on their meeting sides, and means for rotating the said cam-faced collars relatively to each other to separate them and force the wedge-shaped projections against the rods to press the shoes outward against the band of the pulley, substantially as described.

2. In a clutch, the combination, with a pulley and arms B, having cross-heads b at their outer ends, of rods carried by the said arms, seats F, adapted to be supported by the said cross-heads and having mutually-interlocking tongues and grooves between the end portions of the said seats and cross-heads, and shoes carried by the said seats, substantially as described.

3. The combination, with a pulley and arms B, having sleeve D, of rods E, carried by the arms and provided with shoes at their outer ends to bear against the inner side of the band of the pulley, springs for holding the shoes out of engagement with the pulley, collar J, having wedge-shaped projections j to engage with the rods E, collars K and L, having their meeting sides provided with cam-faces, means for actuating the said collars to separate them, and a spring to press collar J away from the pulley, substantially as described, for the purpose specified.

In testimony whereof I affix my signature in presence of two witnesses.

ALVIE MYERS.

Witnesses:
HUBERT F. BEOLS,
G. W. SCHWAB.